US010705758B2

(12) United States Patent
Eliash et al.

(10) Patent No.: US 10,705,758 B2
(45) Date of Patent: Jul. 7, 2020

(54) MULTIPLE SETS OF TRIM PARAMETERS

(71) Applicant: Western Digital Technologies, Inc., San Jose, CA (US)

(72) Inventors: Tomer Tzvi Eliash, Kfar Saba (IL); Asaf Gueta, Or Yehuda (IL); Inon Cohen, Oranit (IL); Yuval Grossman, Kiryat Ono (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/986,744

(22) Filed: May 22, 2018

(65) Prior Publication Data

US 2019/0361625 A1    Nov. 28, 2019

(51) Int. Cl.
*G06F 30/3312* (2020.01)
*G06F 3/06* (2006.01)
*G06F 13/16* (2006.01)

(52) U.S. Cl.
CPC .......... *G06F 3/0659* (2013.01); *G06F 3/0604* (2013.01); *G06F 3/0679* (2013.01); *G06F 13/1668* (2013.01)

(58) Field of Classification Search
CPC ......... G11C 16/14; G11C 7/04; G11C 29/006; G11C 11/14; G06F 1/0203; G06F 11/006; G06F 30/3312
See application file for complete search history.

(56) References Cited

U.S. PATENT DOCUMENTS

| 5,793,674 | A | * | 8/1998 | Kubo | G06F 11/006 365/185.09 |
| 7,739,531 | B1 | * | 6/2010 | Krishnan | G06F 1/3203 713/322 |
| 9,922,714 | B1 | * | 3/2018 | Yu | G11C 16/14 |
| 2007/0225928 | A1 | * | 9/2007 | Gatzemeier | G11C 29/006 702/89 |
| 2009/0109756 | A1 | | 4/2009 | Aritome | |
| 2011/0110164 | A1 | | 5/2011 | Jeong | |
| 2012/0134213 | A1 | * | 5/2012 | Choi | G11C 7/04 365/185.18 |

(Continued)

FOREIGN PATENT DOCUMENTS

| KR | 10-1157763 | 6/2012 |
| KR | 10-1465460 | 11/2014 |

OTHER PUBLICATIONS

International Search Report and Written Opinion from PCT/US2019/016916, dated May 29, 2019, 11 pages.

*Primary Examiner* — Ryan Bertram
*Assistant Examiner* — Trang K Ta
(74) *Attorney, Agent, or Firm* — Morgan, Lewis & Bockius LLP (57) ABSTRACT

Apparatus, methods, media and systems for multiple sets of trim parameters are described. A non-volatile memory device may comprise a first register, a second register, a multiplexer, a first set of I/O lines, each coupled to the first register and the multiplexer, each associated with a particular trim set among multiple trim sets stored in the first register, one or more second I/O lines, each coupled to the second register and the multiplexer. The multiplexer is configured to receive a control signal. The multiplexer is configured to output, based on the control signal, a particular trim set among the multiple trim sets to the second register using the one or more second I/O lines.

21 Claims, 4 Drawing Sheets

(56) References Cited

U.S. PATENT DOCUMENTS

| | | | |
|---|---|---|---|
| 2012/0176844 A1* | 7/2012 | Cunningham | G11C 11/14 365/185.22 |
| 2013/0167099 A1* | 6/2013 | Swain | G06F 30/3312 716/115 |
| 2015/0234603 A1* | 8/2015 | Kitagawa | G11C 16/14 711/103 |
| 2019/0138443 A1* | 5/2019 | Thiruvengadam | G11C 16/3459 |

* cited by examiner

MULTIPLE SETS OF TRIM PARAMETERS

BACKGROUND

Non-volatile memory devices of a data storage systems store values for certain parameters that assist the non-volatile memory devices of the data storage system to operate properly. However, only a single set of these values are stored, and if an operating condition of a particular non-volatile memory device changes, then that particular non-volatile memory device must perform multiple calculations using the stored set of values in order to determine a new set of values that account for the changes in the operating condition of the particular non-volatile memory device. Performing such calculations consumes resources and affects the performance of the non-volatile memory device.

Additionally, the set of values stored within each of the non-volatile memory devices of the data storage system are selected based on the worst performing non-volatile memory device among the non-volatile memory devices of the data storage system. Therefore, even when operating conditions do not, performance capabilities of the better performing non-volatile memory devices are not optimally exploited.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various configurations of the subject disclosure and is not intended to represent the only configurations in which the subject disclosure may be practiced. The appended drawings are incorporated herein and constitute a part of the detailed description. The detailed description includes specific details for the purpose of providing a thorough understanding of the subject disclosure. However, it will be apparent to those skilled in the art that the subject disclosure may be practiced without these specific details. In some instances, structures and components are shown in block diagram form in order to avoid obscuring the concepts of the subject disclosure. Like components are labeled with identical element numbers for ease of understanding.

One or more implementations of the subject technology are directed to selecting one or more sets of parameters from multiple sets of parameters based on changes in operating conditions or configuration of a non-volatile memory device, where the values of such parameters cause the non-volatile memory device to operate differently. In one or more aspects, each set of such parameters may be referred to as "trim parameters," and values of the trim parameters may be referred to as "trim parameter values." As discussed in detail herein, one or more aspects of the subject technology allow for storing of the multiple sets of trim parameters in the non-volatile memory device. The values of each set of trim parameters are selected based on a calibration of the non-volatile memory device to a benchmark set of values. The calibration of the non-volatile memory device is performed based on manufacturing variance of the particular non-volatile memory device.

A multiplexer of the non-volatile memory device transfers one or more of the sets of trim parameters, based on a control signal received by the multiplexer, to a register that the non-volatile memory device is configured to use for the operation of the non-volatile memory device. In some implementations, a controller of the data storage system of the non-volatile memory device can be configured to identify or generate a control signal based on a determination of whether an operating condition of the non-volatile memory device has changed. The controller determines whether an operating condition has changed based on data received from the non-volatile memory device or related to the non-volatile memory device. The controller transfers the control signal to a multiplexer of the non-volatile memory device. In some implementations, a component of non-volatile memory device may be configured to identify or generate a control signal, and transfer the control signal to the multiplexer. For example, a controller of the non-volatile memory device may be configured to identify or generate a control signal, and transfer the control signal to the multiplexer. In such implementations, the controller of the non-volatile memory device may be configured to determine whether an operating condition of the non-volatile memory has changed based on data received from one or more sensors of the non-volatile memory device, such as temperature sensor of the non-volatile memory device or associated with the non-volatile memory device.

Figure 1:
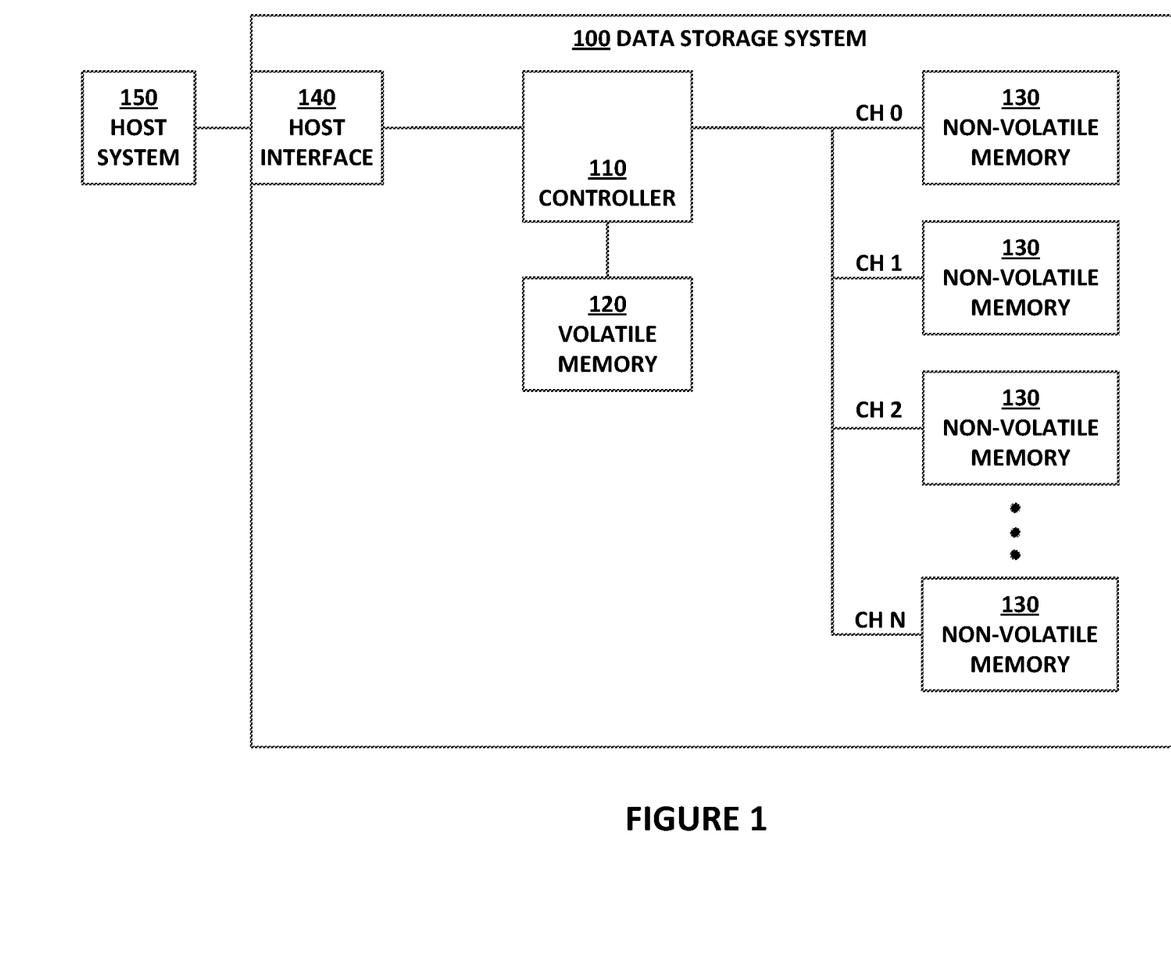
FIG. 1 is a block diagram illustrating components of a data storage system according to an illustrative implementation.

FIG. 1 is a block diagram illustrating components of a data storage system 100 according to aspects of the subject technology. As depicted in FIG. 1, data storage system 100 includes controller 110, volatile memory 120, non-volatile memory 130, and host interface 140. Controller 110 is configured to process requests received from host system 150 via host interface 140 to access data in non-volatile memory 130. The data access requests received from host system 150 may include write requests to store host data in non-volatile memory 130, read requests to retrieve host data stored in non-volatile memory 130, and erase requests to erase host data stored in non-volatile memory 130. Other types of requests, such as status requests or device management requests, may be received from host system 150 and processed by controller 110.

Host interface 140 is configured to couple host system 150 to data storage system 100. Host interface 140 may include electrical and physical connections for operably coupling host system 150 to controller 110. Via the electrical and physical connections, host interface 140 is configured to communicate data, addresses, and control signals between host system 150 and controller 110. Controller 110 is configured to store host data received from host system 150 in non-volatile memory 130 in response to a write request received from host system 150, and to read host data stored in non-volatile memory 130 and to transfer the read host data to host system 150 via host interface 140 in response to a read request received from host system 150.

Host interface 140 may implement standard interfaces including, but not limited to, Serial Advanced Technology Attachment (SATA), Advanced Technology Attachment (ATA), Small Computer System Interface (SCSI), PCI-extended (PCI-X), Fibre Channel, Serial Attached SCSI (SAS), Secure Digital (SD), Embedded Multi-Media Card (EMMC), Universal Flash Storage (UFS) and Peripheral Component Interconnect Express (PCIe). However, the subject technology is not limited to the use of standard interfaces and may utilize custom or proprietary interfaces for communications with host system 150.

Host system 150 represents any device configured to be coupled to and communicate with data storage system 100 via host interface 140 to store and retrieve data in data storage system 100. Host system 150 may be a computing device such as a personal computer, a server, a workstation, a laptop computer, a smart phone, and the like. Alternatively, host system 150 may be an electronic device such as a digital camera, a digital audio player, a digital video recorder, and the like.

Controller 110 is configured to monitor and control the operation of components of data storage system 100 in response to requests received from host system 150 and during execution of internal maintenance operations. Controller 110 may include a multi-core processor, a general-purpose microprocessor, a microcontroller, a digital signal processor (DSP), an application specific integrated circuit (ASIC), a field programmable gate array (FPGA), a programmable logic device (PLD), a state machine, gated logic, discrete hardware components, or a combination of the foregoing. In some aspects, one or more components of controller 110 may be integrated into a single chip or module, or may be implemented in two or more discrete chips or modules.

Volatile memory 120 represents memory used by controller 110 to temporarily store data and information used to manage data storage system 100. For example, controller 110 may use volatile memory 120 as buffers for host data waiting to be written to non-volatile memory 130 or host data read from non-volatile memory 130 waiting to be transferred to host system 150 or written back to non-volatile memory 130. Controller 120 also may use volatile memory 120 as buffers for raw page data and decoded page data for using in the tracking and adjustment of read levels according to the subject technology described herein. Controller 110 also may store various types of system data used in the management of data storage system 100 in volatile memory 120. The system data may include tables mapping logical addresses referenced by host system 150 to physical addresses of non-volatile memory 130, program/erase (P/E) cycle counts, error statistics, valid/invalid data counts, etc. Controller 110 may store some or all of the data and information described above in non-volatile memory 130, or another form of non-volatile memory not shown, so as to preserve the data and information when data storage system 100 is shut down or otherwise loses power. Controller 110 may periodically store copies of the data and information in non-volatile memory 130 or may wait for a shutdown or power-loss event to back up the data and information in non-volatile memory 130.

Volatile memory 120 may be a random-access memory (RAM) such as static RAM (SRAM) or dynamic RAM (DRAM). However, the subject technology is not limited to any particular type of RAM. In addition, volatile memory 120 may be implemented using a single RAM module or multiple RAM modules. While volatile memory 120 is depicted as being distinct from controller 110, portions or all of volatile memory 120 may be incorporated into controller 110.

As depicted in FIG. 1, multiple non-volatile memory devices 130 are arranged in multiple channels. For example, FIG. 1 illustrates each of N channels having one non-volatile memory device 130. Each of the non-volatile memory devices 130 may include a single die or multiple die. Each die may include an array of non-volatile memory cells, such as NAND flash memory cells, where each cell may be used to store one or more bits of data. For purposes of this description, the flash memory cells are configured to store three bits of data per cell in a triple-level cell (TLC) configuration. However, the subject technology is not limited to this configuration and may be implemented in systems configured to store two bits of data per cell in a multi-level cell (MLC) configuration, four bits per cell in a quad-level cell (QLC) configuration, etc. Each of the non-volatile memory devices 130 may be implemented in respective chips or packages. While each channel is depicted as having a single non-volatile memory device 130, the subject technology may include implementations in which each channel includes two or more non-volatile memory devices 130.

The flash memory cells of a die may be arranged in physical blocks, with each block containing multiple wordlines. Each wordline includes a number of memory cells (e.g., 1 k, 2 k, 4 k, etc.). Depending on the number of bits stored per cell, multiple pages of data may be stored in each wordline. For example, in TLC flash memory three pages of data may be stored in each wordline. The subject technology is not limited to any particular number of wordlines in each physical block. For example, each block may contain 8 wordlines, 16 wordlines, 32 wordlines, etc. Furthermore, the number of physical blocks contained in each flash memory die is not limited to any particular number. In NAND flash memory, the page of a wordline, or the wordline as a whole, represents the smallest unit available for writing data to the flash memory die or reading data from the flash memory die. Physical blocks represent the smallest unit available for erasing data in the flash memory die.

Controller 110 is configured to communicate commands, control information, addresses, data, etc. with the flash memory die via the respective flash memory channels 0-N. Each channel may represent one or more buses configured to communicate electrical signals encoded with commands, control information, addresses, and/or data between controller 110 and the flash memory die coupled to the respective flash memory channel. The subject technology is not limited to any particular number of flash memory channels. For example, data storage system 100 may include 8 channels, 16 channels, 32 channels, etc., without departing from the scope of the subject technology.

In addition to the components depicted in FIG. 1, the controller 110 may include other components. For example, controller 110 may include managers and schedulers for managing read, write, and erase operations within data storage system 100. Controller 110 may include an encoder for encoded data prior to storage in non-volatile memory 130. The encoder and decoder are not limited to any particular error-correcting code (ECC) algorithm. For example, a low-density parity-check code may be used to encode and decode data within data storage system 100. Controller 110 may include multiple instances of encoder and decoders, some of which may be dedicated to soft decoding processes while others to hard decoding processes. Controller 110 also may include an address translation manager to manage the translation of host addresses used by host system 150 to physical addresses of the blocks, wordlines and pages within non-volatile memory 130. Other components may include scramblers, descramblers, maintenance managers (e.g., garbage collection, wear leveling, data relocation, etc.).

The components of controller 110 each may be implemented using one or more sequences of instructions (e.g., software/firmware) loaded and executed by a processor or processor core, using hardware logic circuits, or a combination of hardware and software/firmware. For example, in a controller that includes multiple processors or a multi-core processor, individual processors or processor cores may be assigned to provide the functionality of respective components of controller 110. Furthermore, one or more of the components discussed above may be implemented outside of controller 110 without departing from the scope of the subject technology.

Figure 2A:
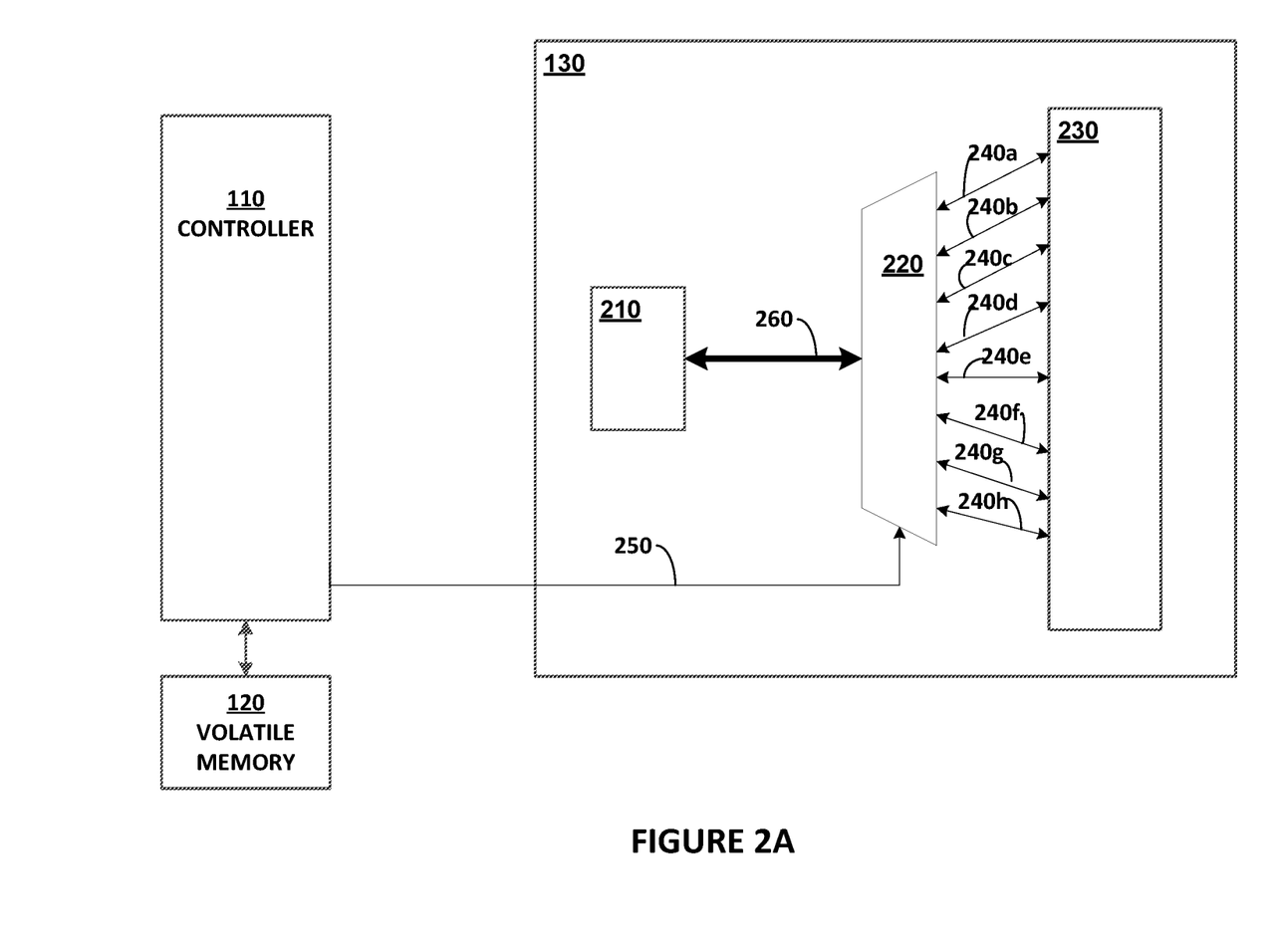
FIG. 2A is a block diagram illustrating components of a controller and a non-volatile memory device of a data storage system according to an illustrative implementation.

Turning now to FIG. 2A, there is shown an example block diagram of a non-volatile memory device of a data storage system. For the purpose of illustrating a clear example, components shown and described with reference to in FIG. 1 will be used to describe the arrangement of components shown in FIG. 2A. As depicted in FIG. 2A, the non-volatile memory device 130 includes a register 210, a multiplexer 220, a register 230, an input/output (I/O) line 260, I/O lines 240a, 240b, 240c, 240d, 240e, 240f, 240g, 240h, generally referred to herein as I/O lines 240.

The I/O line 260 communicatively couples the register 210 and the multiplexer 220. Each of the I/O lines 240 communicatively couples a portion of the register 230 and the multiplexer 220. In some implementations, the register 230 is configured with multiple I/O interfaces, and each of the I/O lines 240 couples one of the I/O interfaces of the register 230 with the multiplexer 220. The register 230 is configured to store multiple sets of multiple parameters, where the values of such parameters cause the non-volatile memory device 130 to operate differently. For example, a value of one of the parameters in one set of parameters may indicate that two volts may be applied to the components of the non-volatile memory device 130 while storing data in the non-volatile memory device 130, while a value of another parameter or the same parameter in a different set of parameters may indicate that three volts may be applied to the components of the non-volatile memory device 130 while storing data in the non-volatile memory device 130. In one or more aspects, each set of such parameters may be referred to as "trim parameters," and values of the trim parameters may be referred to as "trim parameter values."

For a particular non-volatile memory device, such as the non-volatile memory device 130, the values of each set of trim parameters are determined during the manufacturing of the non-volatile memory device 130. The values of each set of trim parameters are determined based on calibration of that particular non-volatile memory device to certain benchmark values for the set of trim parameters. Due to the variance amongst the components used in manufacturing one non-volatile memory device and another non-volatile memory device, the values of at least some sets of trim parameters for one non-volatile memory device may be different from the values of at least some sets of trim parameters in another non-volatile memory device. For example, if a benchmark value of voltage to be supplied to represent a high bit value, such as a '1', while storing data is 1 volt, then due to the components used in manufacturing the first non-volatile memory device, only 0.9 volts may be required for successfully storing a high bit value in the first non-volatile memory device, whereas, due to the components used in manufacturing the second non-volatile memory device, only 0.8 volts may be required for successfully storing a high bit value in the second non-volatile memory device. Therefore, the values for each set of trim parameters for each non-volatile memory device, such as non-volatile memory device 130, within a data storage system, such as data storage system 100, are determined specific to the non-volatile memory device. In other words, the values are non-volatile memory device specific. In some implementations, one or more sets of trim parameters of one non-volatile memory device in a data storage system may be different from one or more sets of trim parameters of another non-volatile memory device within the same data storage system. For example, one non-volatile memory device in a data storage system, such as the non-volatile memory device 130 in data storage system 100, may be configured for quad-level-cell programming and store a set of trim parameters associated with quad-level cell programming, while another non-volatile memory device is configured for triple-level-cell programming, but not quad-level-cell programming and may not store a set of parameters associated with quad-level-cell programming.

Each set of trim parameters can be specified for a particular type of operating condition or configuration of the non-volatile memory device 130. For example, values for a set of trim parameters can be selected for when temperature within the non-volatile memory device 130 satisfies a certain threshold amount. In some implementations, values for a set of trim parameters can be determined for different ranges of temperatures. For example, values for one set of trim parameters can be determined for temperatures between 0-20 degrees, values for another set of trim parameters can be determined for temperatures between 21-40 degrees, values for another set of trim parameters can be determined for temperatures between 41-60 degrees, and the like. Again, as described above, values for each of the trim parameters are determined based on calibration of the particular non-volatile memory device. Therefore, values for each set of the trim parameters in the above example may be determined based on calibration of the non-volatile memory device 130.

Similarly, values of a set of trim parameters may be determined for each configuration of a non-volatile memory device, such as the non-volatile memory device 130. For example, the non-volatile memory device 130 may be configured such that a portion of the memory blocks of the non-volatile memory device 130 can be programmed as single-level cell, another portion of the memory blocks can be programmed as multi-level cell, another portion of the memory blocks can be programmed as triple-level, while another portion of the memory blocks of the non-volatile memory device 130 can be programmed as quad-level cell. For each type of programming a particular set of trim parameters can be selected and values for that set of trim parameters can be determined based on the calibration of the non-volatile memory device 130.

Figure 2B:
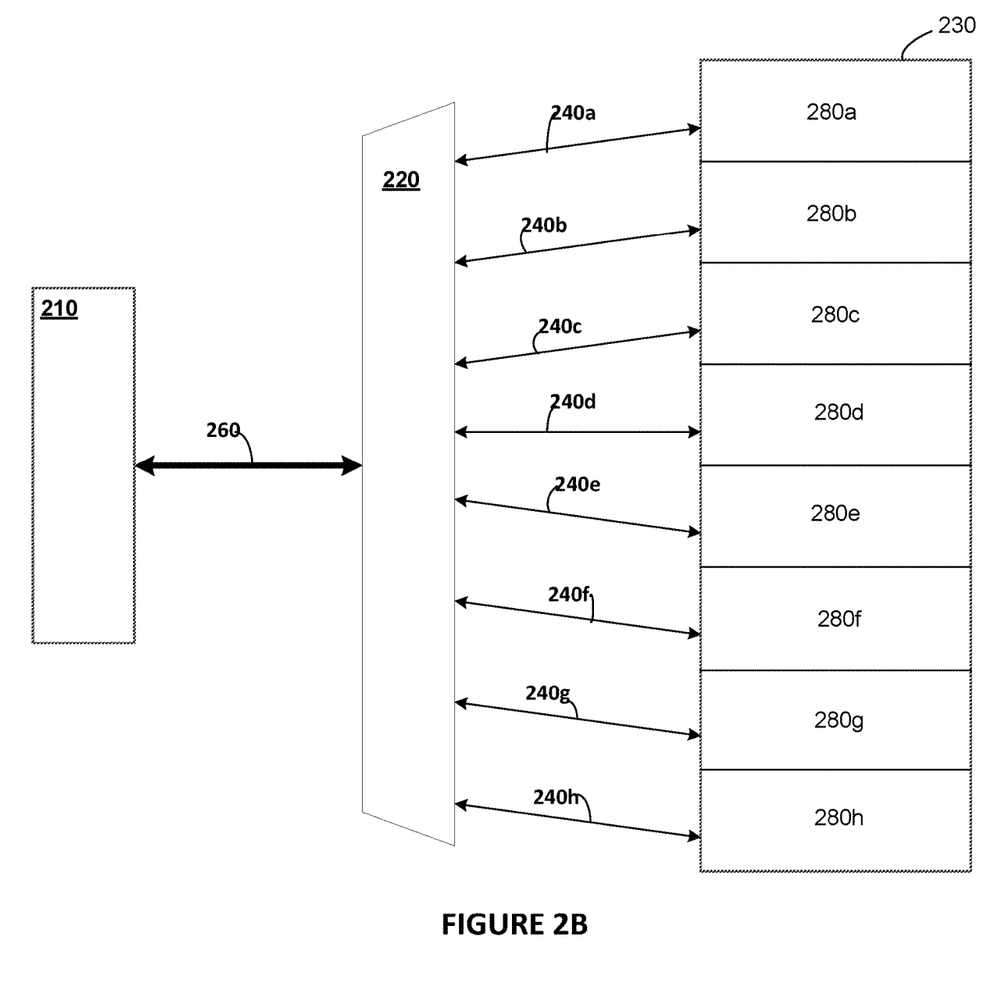
FIG. 2B is a block diagram illustrating components of a non-volatile memory device of a data storage system according to an illustrative implementation.

The multiple sets of trim parameters are stored within register 230, as shown in FIG. 2B. In FIG. 2B, a set of trim parameters 280a is stored in one portion of the register 230, a set of trim parameters 280b is stored in another portion of the register 230, a set of trim parameters 280c is stored in another portion of the register 230, a set of trim parameters 280d is stored in another portion of the register 230, a set of trim parameters 280e is stored in another portion of the register 230, a set of trim parameters 280f is stored in another portion of the register 230, a set of trim parameters 280g is stored in another portion of the register 230, and a set of trim parameters 280h is stored in another portion of the register 230. As described above, the register 230 is configured with multiple I/O interfaces, and each I/O interface is associated with a portion of the register 230 and coupled to multiplexer 220 via I/O lines 240. For example, an I/O interface associated with the set of trim parameters 280a is coupled to multiplexer 220 via I/O line 240a, an I/O interface associated with the set of trim parameters 280b is coupled to multiplexer 220 via I/O line 240b, an I/O interface associated with the set of trim parameters 280c is coupled to multiplexer 220 via I/O line 240c, an I/O interface associated with the set of trim parameters 280d is coupled to multiplexer 220 via I/O line 240d, an I/O interface associated with the set of trim parameters 280e is coupled to multiplexer 220 via I/O line 240e, an I/O interface associated with the set of trim parameters 280f is coupled to multiplexer 220 via I/O line 240f, an I/O interface associated with the set of trim parameters 280g is coupled to multiplexer 220 via I/O line 240g, and an I/O interface associated with the set of trim parameters 280h is coupled to multiplexer 220 via I/O line 240h.

Returning to FIG. 2A, the controller 110 is configured to transfer a control signal to multiplexer 220 via a control or data line, such as control line 250. A control line may be a line between a first component and a second component that is configured to carry one or more control signals from the first component to a second component. In some implementations, a component of the non-volatile memory device 130 may be configured to transfer a control signal to the multiplexer 220 via a control line or a data line (not shown) that communicatively couples the component and the multiplexer 220. An example of the component may be a controller of the non-volatile memory device 130 (not shown). In some implementations, multiple control lines or data lines may communicatively couple the multiplexer 220 and the controller 110. In some implementations, multiple control lines or data lines may communicatively couple the multiplexer 220 and a component of the non-volatile memory device 130 that is configured to identify or generate control signals for the multiplexer 220, such as a controller of the non-volatile memory device 130. Based on the received control signal, the multiplexer 220 is configured to select an I/O line 240, and transfer the set of trim parameters received via the selected I/O line 240 to the register 210 via the I/O line 260. For example, if the multiplexer 220 is configured to select the I/O line 240b in response to receiving a control signal "001," then the multiplexer 220 receives the set of trim parameters 280b and transfers the set of trim parameters 280b to the register 210 via I/O line 260. In some implementations, the multiplexer 220 is configured to select multiple I/O lines 240 based on a control signal. For example, the multiplexer 220 can be configured to select all of the I/O lines 240 in response to receiving control signal "1111." In some implementations where the multiplexer 220 is configured to select multiple I/O lines 240, the multiplexer 220 is configured to transfer the sets of trim parameters received via the selected I/O lines 240 to the register 220 in an order. For example, the multiplexer 220 can be configured with an order configuration of the different trim parameters, which may order the set of trim parameters 280a as first in order to be transferred, the set of trim parameters 280b as second in order to be transferred, the set of trim parameters 280c as third in order to be transferred, the set of trim parameters 280d as fourth in order to be transferred, the set of trim parameters 280e as fifth in order to be transferred, the set of trim parameters 280f as sixth in order to be transferred, the set of trim parameters 280g as seventh in order to be transferred, and the set of trim parameters 280h as eighth in order to be transferred, and if the multiplexer 220 selects I/O lines 240c, 240f, and 240h, then the multiplexer 220, based on the order configuration data, transfers the set of trim parameters 280c first, 280f second, and 280h as third to the register 210. The non-volatile memory device 130 is configured to modify its operating configuration based on the set of trim parameters stored in the register 210.

The controller 110 is configured to select a control signal based on one or more inputs to the controller. For example, the controller 110 may receive temperature data of the non-volatile memory device 130 from temperature sensors associated with the non-volatile memory device 130, and the controller 110 may select a particular control signal based on whether the received temperature data satisfies a threshold temperature data, and transfers the control signal to the multiplexer 220. Similarly, the controller 110 may select a control signal based on inputs received from the host system 150, and transfer the selected control signal to the multiplexer 220, thereby causing different or additional sets of trim parameters to be loaded into the register 210 in the non-volatile memory device 130 and causing the non-volatile memory device 130 modify its operating behavior or configuration.

Figure 3:
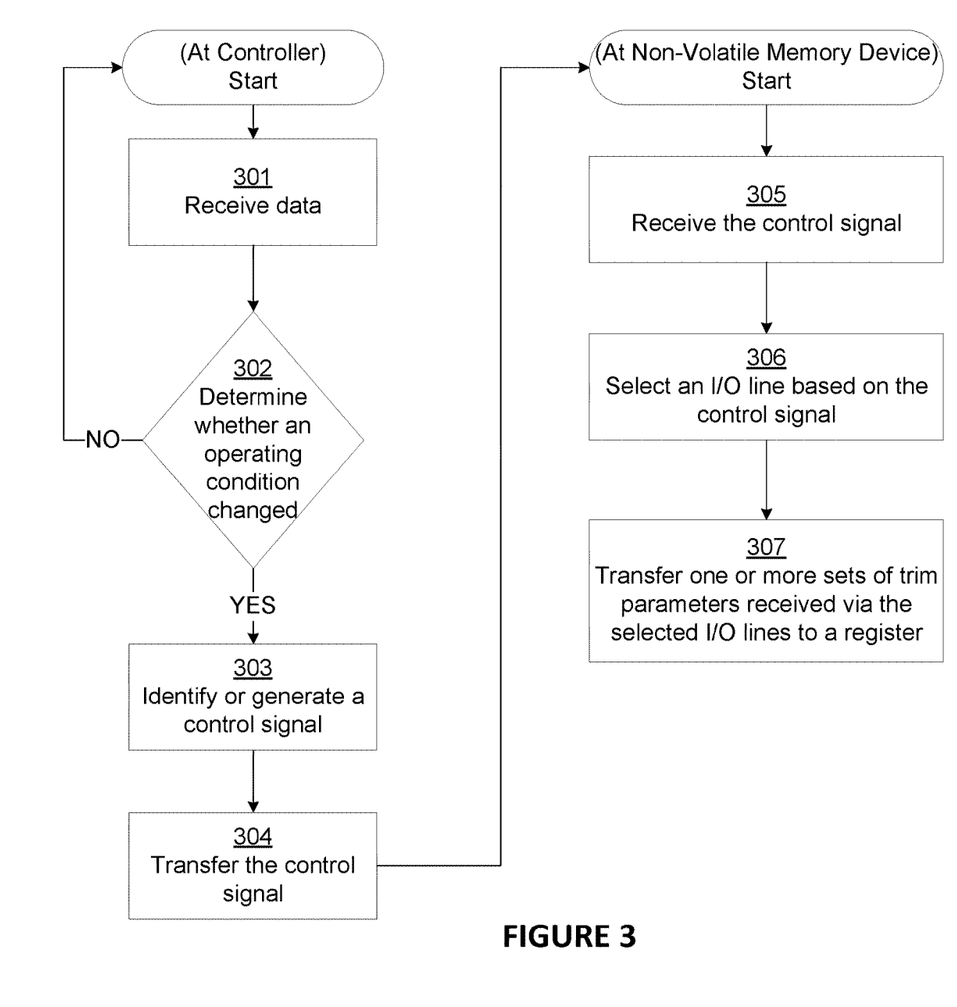
FIG. 3 is a flow chart of an example method of selecting one or more sets of trim parameters for use by a non-volatile memory device of a data storage system according to an illustrative implementation.

Turning now to FIG. 3, there is shown a flowchart illustrating a process of selecting a control signal and updating the set of trim parameters used by a non-volatile memory device. For the purpose of illustrating a clear example, components of the data storage system 100 shown and described with reference to FIGS. 1 and 2 will be used to describe the process of a control signal and updating the set of trim parameters. The method 300 includes receiving data at a controller of a data storage system, such as the controller 110 of the data storage system 100 (block 301). As described above, the controller 110 can receive data from one or more of the non-volatile memory devices 130 of the data storage system 100, and the controller 110 can receive data from the other computing devices of the data storage system 100 or coupled to the data storage system 100, such as the host system 150. The data received by the controller 110 includes, but is not limited to, sensor data, such as from temperature sensors, program erase cycles (PEC) data, and the like.

The controller 110 determines whether an operating condition of the non-volatile memory device 130 has changed, based on the received data (block 302). For example, the controller 110 can determine that an operating condition of the non-volatile memory device 130 has changed if the temperature data indicates that temperature of the non-volatile memory device satisfies a threshold temperature. Similarly, the controller 110 can determine that the operating condition of the non-volatile memory device 130 has changed if the PEC data of the non-volatile memory device 130 satisfies a threshold PEC value for that non-volatile memory device. If the controller 110 determines that the operating condition has not changed, then the process continues to start of method 300. If the controller 110 determines that the operation condition of the non-volatile memory device 110 has changed, then the controller 110 identifies or generates a control signal (block 303). In some implementations, the controller 110 can be configured to identify a control signal based on the determined operating condition. In some implementations, the controller 110 can be configured to identify a control signal based on a set of rules or control signal configuration data that specifies different control signals for different operating conditions. In some implementations, the controller 110 can be configured to generate a control signal based on a set of rules and the operating condition. For example, if the controller determines that the operating condition is changed because the temperature of the non-volatile memory device, such as the non-volatile memory device 130, satisfied a threshold temperature, then the controller 110, using a set of rules that specify a trim set associated with the new or changed temperature of the non-volatile memory device, can be configured to generate a control signal associated with the trim set.

The controller 110 transfers the control signal to a non-volatile memory device (block 304). The controller 110 transfers the control signal to the non-volatile memory device with which the data received in block 301 is related or to the non-volatile memory device from which the data is received in block 301. As described above, the controller 110 can transfer a control signal to a non-volatile memory device by transferring it to a multiplexer, such as the multiplexer 220.

The process next continues to the non-volatile memory device to which the control signal was transferred by the controller 110, such as the non-volatile memory device 130. At the multiplexer, such as the multiplexer 220, the control signal from the controller 110 is received (block 305). As described above, a component of the non-volatile memory device 130, such as a controller of the non-volatile memory device 130, may transfer a control signal to the multiplexer, such as the multiplexer 220. As described above, the multiplexer selects an I/O line, such an I/O line 240 based on the control signal (block 306). In some implementations, as described above, the multiplexer may select one or more I/O lines. The multiplexer 220, transfers the data of the set of trim parameters, received via the selected I/O line, to a register (block 307). The register to which the multiplexer 220 transfers received data of the set of trim parameters is a register that is configured to store a current set of trim parameters to be used by the non-volatile memory device of the multiplexer 220, such as the non-volatile memory device 130. In some implementations, where the multiplexer 220 selects multiple I/O lines, the multiplexer 220 transfers data of each set of trim parameters received via the selected I/O lines to the register that is configured to store a current set of trim parameters to be used by the non-volatile memory device. Thereby, the controller 110, by transmitting the control signal, causes the one or more sets of trim parameters to be used by the non-volatile memory device, such as the non-volatile memory device 130.

The blocks of the flowchart illustrated in FIG. 3 have been described as occurring sequentially. The subject technology is not limited to the described sequential performance of the illustrated process. One or more of the blocks may be performed in parallel with other blocks in the illustrated process. Other variations in the illustrated process are within the scope of the subject technology.

Various examples of aspects of the disclosure are described below. These are provided as examples, and do not limit the subject technology.

In one or more implementations, a non-volatile memory device includes a first register, a second register, a multiplexer, a first set of input/output (I/O) lines, one or more second I/O lines, one or more control lines. Each of the first set of I/O lines is coupled to first register and the multiplexer, and each of the first set of I/O lines is associated with a particular trim set among multiple trim sets stored in the first register. Each of the one or more second I/O lines is coupled to the second register and the multiplexer. Each of the one or more control lines is coupled to the multiplexer and a controller of a data storage system. The multiplexer is configured to receive a control signal from the controller via the one or more control lines. The multiplexer is configured to output, based on the control signal, a particular trim set among the multiple trim sets to the second register using the one or more second I/O lines.

In one or more aspects, a computer implemented method includes determining whether an operating condition of a first non-volatile memory device is changed. The method includes in response to determining that the operating condition of the first non-volatile memory device is changed identifying one or more first trim sets calibrated for the first non-volatile memory device and associated with the changed operating condition of the first non-volatile memory device. The method includes in response to determining that the operating condition of the first non-volatile memory device is changed transferring one or more control signals for the one or more first trim sets to the first non-volatile memory device, causing the one or more first trim sets to be used by the first non-volatile memory device.

In one or more implementations, a data storage system includes a first non-volatile memory component. The data storage system includes a means for receiving data from a first non-volatile memory component. In response to determining that the operating condition of the first non-volatile memory component is changed, the data storage system includes a means for identifying one or more first trim sets calibrated for the first non-volatile memory component and associated with the changed operating condition of the first non-volatile memory component. In response to determining that the operating condition of the first non-volatile memory component is changed, the data storage system includes a means for transferring one or more control signals for the one or more first trim sets to the first non-volatile memory component, causing the one or more first trim sets to be used by the first non-volatile memory component.

In one or more implementations, a non-transitory machine-readable medium includes machine-executable instructions thereon that, when executed by a processor, perform a method. The method includes determining whether an operating condition of a first non-volatile memory device is changed. In response to determining that the operating condition of the first non-volatile memory device is changed, the method includes identifying one or more first trim sets calibrated for the first non-volatile memory device and associated with the changed operating condition of the first non-volatile memory device. In response to determining that the operating condition of the first non-volatile memory device is changed, the method includes causing transfer of the one or more control signals for the one or more first trim sets to the first non-volatile memory device, wherein the transfer causes the one or more first trim sets to be used by the first non-volatile memory device.

It is understood that other configurations of the subject technology will become readily apparent to those skilled in the art from the detailed description herein, wherein various configurations of the subject technology are shown and described by way of illustration. The subject technology is capable of other and different configurations and its several details are capable of modification in various other respects, all without departing from the scope of the subject technology. Accordingly, the drawings and detailed description are to be regarded as illustrative in nature and not as restrictive.

Many of the above-described features of example process and related features and applications, may be implemented as software or firmware processes that are specified as a set of instructions recorded on a processor-readable storage medium (also referred to as computer-readable medium). When these instructions are executed by one or more processing unit(s) (e.g., one or more processors, cores of processors, or other processing units), the processing unit(s) are caused to perform the actions indicated in the instructions. Examples of processor-readable media include, but are not limited to, volatile memory 120, non-volatile memory 130, as well as other forms of media such as magnetic media, optical media, and electronic media. The processor-readable media does not include carrier waves and electronic signals communicated wirelessly or over wired connections.

The term "software" is meant to include, where appropriate, firmware residing in memory or applications stored in memory, which may be read into a working memory for processing by a processor. Also, in some implementations, multiple software aspects of the subject disclosure may be implemented as sub-parts of a larger program while remaining distinct software aspects of the subject disclosure. In some implementations, multiple software aspects may also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code).

It is understood that illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject disclosure.

It is understood that the specific order or hierarchy of steps in the processes disclosed is presented as an illustration of some exemplary approaches. Based upon design preferences and/or other considerations, it is understood that the specific order or hierarchy of steps in the processes may be rearranged. For example, in some implementations some of the steps may be performed simultaneously. Thus the accompanying method claims present elements of the various steps in a sample order, and are not meant to be limited to the specific order or hierarchy presented.

The previous description is provided to enable any person skilled in the art to practice the various aspects described herein. The previous description provides various examples of the subject disclosure, and the subject disclosure is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

The phrases "in communication with" and "coupled" mean in direct communication with or in indirect communication with via one or more components named or unnamed herein (e.g., a memory card reader)

A phrase such as an "aspect" does not imply that such aspect is essential to the subject disclosure or that such aspect applies to all configurations of the subject disclosure. A disclosure relating to an aspect may apply to all configurations, or one or more configurations. An aspect may provide one or more examples. A phrase such as an aspect may refer to one or more aspects and vice versa. A phrase such as an "implementation" does not imply that such implementation is essential to the subject disclosure or that such implementation applies to all configurations of the subject disclosure. A disclosure relating to an implementation may apply to all aspects, or one or more aspects. An implementation may provide one or more examples. A phrase such as an "implementation" may refer to one or more implementations and vice versa. A phrase such as a "configuration" does not imply that such configuration is essential to the subject disclosure or that such configuration applies to all configurations of the subject disclosure. A disclosure relating to a configuration may apply to all configurations, or one or more configurations. A configuration may provide one or more examples. A phrase such as a "configuration" may refer to one or more configurations and vice versa.

The word "exemplary" is used to mean "serving as an example or illustration." Any aspect or design described herein as "exemplary" is not necessarily to be construed as preferred or advantageous over other aspects or designs.

What is claimed is:

1. A data storage system, comprising:
 a non-volatile memory device comprising:
  a first register;
  a second register;
  a multiplexer;
  a first set of input/output (I/O) lines, each coupled to the first register and the multiplexer, each associated with a particular trim set among a plurality of trim sets stored in the first register; and
  one or more second I/O lines, each coupled to the second register and the multiplexer;
 a second non-volatile memory device comprising: a third register having a second plurality of trim sets; a fourth register; and a second multiplexer; and
 a controller located outside the non-volatile memory device and outside the second non-volatile memory device, the controller coupled to and configured to control the multiplexer and the second multiplexer,
 wherein:
  the multiplexer is configured to:
   receive a control signal from the controller of the data storage system comprising the non-volatile memory device; and
   output, based on the control signal, a particular trim set among the plurality of trim sets to the second register using the one or more second I/O lines;
  the controller is configured to receive temperature data of the non-volatile memory device and select the control signal based on the received temperature data;
  the controller is configured to select a second control signal based on one or more inputs from a host system located outside the data storage system, and configured to transfer the selected second control signal to the multiplexer to cause one or more additional trim sets to be loaded into the second register and to cause the non-volatile memory device to modify an operating behavior or a configuration of the non-volatile memory device;
  the multiplexer is configured with an order configuration, configured to select two or more I/O lines of the first set of I/O lines, and configured to transfer, in sequence based on the order configuration, (a) a first trim set among the plurality of trim sets associated with a first one of the two or more I/O lines and (b) a second trim set among the plurality of trim sets associated with a second one of the two or more I/O lines; and
  based on a third control signal from the controller, the second multiplexer is configured to provide, to the fourth register, one or more trim sets of the second plurality of trim sets.

2. The data storage system of claim 1, wherein data in each trim set of the plurality of trim sets is based on calibration of the non-volatile memory device.

3. The data storage system of claim 2, wherein the calibration of the non-volatile memory device is based on a manufacturing variance of the non-volatile memory device.

4. The data storage system of claim 1, wherein the control signal is based on a change in operating condition of the non-volatile memory device.

5. The data storage system of claim 1, wherein data in each trim set of the second plurality of trim sets is based on calibration of the second non-volatile memory device.

6. The data storage system of claim 5, wherein the calibration of the second non-volatile memory device is based on a manufacturing variance of the second non-volatile memory device.

7. The data storage system of claim 1, wherein data in each trim set of the second plurality of trim sets is associated with an operating condition of the second non-volatile memory device.

8. The data storage system of claim 1, wherein the multiplexer is further configured to:
 select, based on the control signal, one or more I/O lines among the first set of I/O lines; and
 receive data of one or more trim sets of the plurality of trim sets, wherein the one or more trim sets of the plurality of trim sets are associated with the one or more selected I/O lines.

9. The data storage system of claim 1, wherein data in each trim set of the plurality of trim sets is associated with an operating condition of the non-volatile memory device.

10. The data storage system of claim 1, comprising:
 one or more control lines, each coupled to the multiplexer and the controller of the data storage system, wherein the multiplexer is configured to receive the control signal from the controller via the one or more control lines.

11. The data storage system of claim 1, wherein the controller is configured to generate the control signal based on a set of rules and an operating condition of the non-volatile memory device, and
 wherein the non-volatile memory device is a first die, and the second non-volatile memory device is a second die different from the first die.

12. A computer-implemented method, comprising:
 receiving data of a first non-volatile memory device, wherein the data comprises temperature data of the first non-volatile memory device;
 determining whether an operating condition of the first non-volatile memory device is changed, based on the received data comprising the temperature data;
 in response to determining that the operating condition of the first non-volatile memory device is changed, based on the received data comprising the temperature data:
  identifying one or more predetermined first trim sets calibrated for the first non-volatile memory device and associated with the changed operating condition of the first non-volatile memory device; and
  transferring one or more control signals for the one or more predetermined first trim sets to the first non-volatile memory device, causing the one or more predetermined first trim sets to be used by the first non-volatile memory device;
 selecting a control signal based on one or more inputs from a host system;
 transferring the selected control signal to cause one or more additional trim sets to be loaded into a register of the first non-volatile memory device and to cause the first non-volatile memory device to modify an operating behavior or a configuration of the first non-volatile memory device;
 configuring a multiplexer of the first non-volatile memory device with an order configuration;
 selecting two or more input/output (I/O) lines of the first non-volatile memory device; and
 transferring, in sequence based on the order configuration, (a) a first trim set associated with a first one of the two or more I/O lines and (b) a second trim set associated with a second one of the two or more I/O lines.

13. The computer-implemented method of claim 12, wherein the one or more predetermined first trim sets are stored in a data storage unit of the first non-volatile memory device.

14. The computer-implemented method of claim 12, further comprising:
   determining whether an operating condition of a second non-volatile memory device is changed;
   in response to determining that the operating condition of the second non-volatile memory device is changed:
      identifying one or more second trim sets calibrated for the second non-volatile memory device and associated with the changed operating condition of the second non-volatile memory device; and
      transferring one or more control signals for the one or more second trim sets to the second non-volatile memory device, causing the one or more second trim sets to be used by the second non-volatile memory device.

15. The computer-implemented method of claim 14, wherein the one or more second trim sets are different from the one or more predetermined first trim sets.

16. The computer-implemented method of claim 14, wherein the one or more second trim sets are stored in the second non-volatile memory device.

17. The computer-implemented method of claim 14, wherein the one or more second trim sets are calibrated based on a manufacturing variance of the second non-volatile memory device.

18. The computer-implemented method of claim 12, wherein the one or more predetermined first trim sets are calibrated based on a manufacturing variance of the first non-volatile memory device.

19. A data storage system, comprising:
   a first non-volatile memory component;
   means for receiving data from the first non-volatile memory component, wherein the data comprises temperature data of the first non-volatile memory component;
   means for determining whether an operating condition of the first non-volatile memory component is changed, based on the received data comprising the temperature data;
   in response to determining that the operating condition of the first non-volatile memory component is changed, based on the received data comprising the temperature data:
      means for identifying one or more predetermined first trim sets calibrated for the first non-volatile memory component and associated with the changed operating condition of the first non-volatile memory component; and
      means for transferring one or more control signals for the one or more predetermined first trim sets to the first non-volatile memory component, causing the one or more predetermined first trim sets to be used by the first non-volatile memory component;
   means for selecting a control signal based on one or more inputs from a host system;
   means for transferring the selected control signal to cause one or more additional trim sets to be loaded into a register of the first non-volatile memory component and to cause the first non-volatile memory component to modify an operating behavior or a configuration of the first non-volatile memory component;
   means for configuring a multiplexer of the first non-volatile memory component with an order configuration;
   means for selecting two or more input/output (I/O) lines of the first non-volatile memory component; and
   means for transferring, in sequence based on the order configuration, (a) a first trim set associated with a first one of the two or more I/O lines and (b) a second trim set associated with a second one of the two or more I/O lines.

20. The data storage system of claim 19, further comprising:
   a second non-volatile memory component;
   means for determining whether an operating condition of the second non-volatile memory component is changed, based on data received from the second non-volatile memory component;
   in response to determining that the operating condition of the second non-volatile memory component is changed:
      means for identifying one or more second trim sets calibrated for the second non-volatile memory component and associated with the changed operating condition of the second non-volatile memory component; and
      means for transferring one or more control signals for the one or more second trim sets to the second non-volatile memory component, causing the one or more second trim sets to be used by the second non-volatile memory component.

21. A non-transitory machine-readable medium including machine-executable instructions thereon that, when executed by a processor, perform a method comprising:
   receiving temperature data of a first non-volatile memory device;
   determining whether an operating condition of the first non-volatile memory device is changed, based on the received temperature data of the first non-volatile memory device;
   in response to determining that the operating condition of the first non-volatile memory device is changed, based on the received temperature data of the first non-volatile memory device:
      identifying one or more predetermined first trim sets calibrated for the first non-volatile memory device and associated with the changed operating condition of the first non-volatile memory device; and
      causing transfer of one or more control signals for the one or more predetermined first trim sets to the first non-volatile memory device, wherein the transfer causes the one or more predetermined first trim sets to be used by the first non-volatile memory device;
   selecting a control signal based on one or more inputs from a host system;
   transferring the selected control signal to cause one or more additional trim sets to be loaded into a register of the first non-volatile memory device and to cause the first non-volatile memory device to modify an operating behavior or a configuration of the first non-volatile memory device;
   configuring a multiplexer of the first non-volatile memory device with an order configuration;
   selecting two or more input/output (I/O) lines of the first non-volatile memory device; and
   transferring, in sequence based on the order configuration, (a) a first trim set associated with a first one of the two or more I/O lines and (b) a second trim set associated with a second one of the two or more I/O lines.

* * * * *